(12) United States Patent
Golombowski et al.

(10) Patent No.: US 11,866,618 B2
(45) Date of Patent: Jan. 9, 2024

(54) GLASS BONDING ADHESIVE WITH REDUCED SLIPPAGE

(71) Applicant: DOW GLOBAL TECHNOLOGIES LLC, Midland, MI (US)

(72) Inventors: Dietmar Golombowski, St. Gallen (CH); Andreas Lutz, Galgenen (CH); Stefan Schmatloch, Thalwil (CH)

(73) Assignee: DUPONT SPECIALTY PRODUCTS USA, LLC, Wilmington, DE (US)

( * ) Notice: Subject to any disclaimer, the term of this patent is extended or adjusted under 35 U.S.C. 154(b) by 938 days.

(21) Appl. No.: 16/473,650

(22) PCT Filed: Dec. 21, 2017

(86) PCT No.: PCT/US2017/067788
§ 371 (c)(1),
(2) Date: Jun. 26, 2019

(87) PCT Pub. No.: WO2018/132242
PCT Pub. Date: Jul. 19, 2018

(65) Prior Publication Data
US 2019/0345370 A1   Nov. 14, 2019

Related U.S. Application Data

(60) Provisional application No. 62/444,928, filed on Jan. 11, 2017.

(51) Int. Cl.
| | | |
|---|---|---|
| *C09J 175/06* | (2006.01) |
| *C08G 18/10* | (2006.01) |
| *C08K 3/04* | (2006.01) |
| *C08K 3/36* | (2006.01) |
| *C08G 18/12* | (2006.01) |
| *C08G 18/16* | (2006.01) |
| *C08G 18/18* | (2006.01) |
| *C08G 18/24* | (2006.01) |
| *C08G 18/30* | (2006.01) |
| *C08G 18/42* | (2006.01) |
| *C08G 18/76* | (2006.01) |
| *C08G 18/79* | (2006.01) |
| *C08G 18/72* | (2006.01) |
| *C09J 175/04* | (2006.01) |
| *C09J 175/08* | (2006.01) |
| *C08K 3/22* | (2006.01) |
| *C08K 3/26* | (2006.01) |

(52) U.S. Cl.
CPC ............ *C09J 175/06* (2013.01); *C08G 18/12* (2013.01); *C08G 18/165* (2013.01); *C08G 18/1833* (2013.01); *C08G 18/246* (2013.01); *C08G 18/307* (2013.01); *C08G 18/42* (2013.01); *C08G 18/724* (2013.01); *C08G 18/7671* (2013.01); *C08G 18/792* (2013.01); *C08K 3/04* (2013.01); *C08K 3/36* (2013.01); *C09J 175/04* (2013.01); *C09J 175/08* (2013.01); *C08G 18/10* (2013.01); *C08K 2003/2237* (2013.01); *C08K 2003/265* (2013.01); *C09J 2400/143* (2013.01)

(58) Field of Classification Search
CPC ...... C09J 175/06; C09J 175/04; C09J 175/08; C08G 18/724; C08G 18/10
See application file for complete search history.

(56) References Cited

U.S. PATENT DOCUMENTS

| | | | | |
|---|---|---|---|---|
| 5,143,996 A | * | 9/1992 | Chung | ............... B32B 7/00 528/61 |
| 2008/0185098 A1 | | 8/2008 | Wu et al. | |
| 2010/0154969 A1 | * | 6/2010 | Golombowski | ........ C09J 175/08 524/590 |
| 2016/0046848 A1 | * | 2/2016 | Schmatloch | ........... C08G 18/42 524/425 |
| 2016/0137815 A1 | | 5/2016 | Araki et al. | |

FOREIGN PATENT DOCUMENTS

| | | |
|---|---|---|
| JP | 2016-194053 A | 11/2016 |
| WO | WO 2009/144280 | 12/2009 |

OTHER PUBLICATIONS

Desmodur N-3300_Product Data Sheet. 2017.*
JP2016-194053 Machine Translation.

* cited by examiner

Primary Examiner — Michael L Leonard

(57) ABSTRACT

A novel primerless adhesive composition with unique properties in automotive related applications, particularly in glass bonding applications; the process of making thereof.

9 Claims, No Drawings

GLASS BONDING ADHESIVE WITH REDUCED SLIPPAGE

The present invention relates to a new primerless adhesive composition having unique properties in automotive related applications, particularly in glass bonding applications.

A typical, glass bonding adhesive kit contains a primer and a moisture cured urethane adhesive. The glass bonding primer typically contains organic solvents, organosilane intermediates, isocyanate prepolymers, film formers, carbon black, catalysts, and stabilizers. The primer modifies the surface of the glass to enable good bonding with the moisture cured urethane adhesive. The isocyanates within the primers undergo moisture curing to produce a crosslinked thermoset network which makes the primer robust enough to have sufficient durability under ambient conditions. However, the primer has to have enough crosslink density to sustain high temperature and humidity conditions. As part of the general simplification and process streamlining, many vehicle manufacturers have been trying to eliminate surface pretreatment steps using a separate prime composition. This way, the adhesive is intended to be directly applied onto glass or paint without a separate prime application step. Key requirements for such simplified applications are adhesion built-up of the adhesive to paint, e-coat and glass in order to form long term durable joints. It is important that the bonded glasses may not slip out of the original position due to deformation of the adhesive or displacement of the adhesive at the substrate interface. Slippage occurs predominantly on plain surfaces of the glass and the paints with low surface roughness.

Therefore, it is desirable to have a glass bonding adhesive composition that can be applied to glass surfaces without a pretreatment with primes and with little or no slippage after the application. It is further desirable that such adhesive can be applied without any additional heating steps. In other words, it is desirable to have a flowable adhesive during cold or room temperature.

The present invention provides such a unique adhesive composition by carefully selecting the dosage of isocyanates and the dosage of 2,2'-dimorpholinodiethylether ("DMDEE") in the adhesive that allow the adhesive to be applied at cold or room temperature, exhibit minimal slippage, and provide good surface tack when applied to plain glass.

A typical adhesive composition of the present invention comprises A) (which include both A-I and A-II, two kinds of fillers) fillers which can be one of white pigments, carbon black, calcinated kaolin, fumed silica, calcium carbonate, uncoated kaoline, of a mixture thereof; B) a glass adhesion promotor; C) one or more catalysts; D) a plasticizer; E) prepolymer (include both E-I and E-II prepolymers); F) isocyanate; and G) a solvent or heat stabilizer. It is important to keep the ratio between the prepolymer and the fillers at a range between 1.2 to 3.55, preferably between 1.6 to 3.0, and more preferably between 2.2 to 2.9 in order to have an improved slippage property (≤3.55%).

Different fillers may be used at different amounts. For adhesive composition that contains A-I fillers, in a typical embodiment, the adhesive composition may comprise, based on the total weight of the adhesive composition, 10 to 26 wt. %, preferably 16 to 25 wt. % and more preferably 18 to 23 wt. % of a carbon black such as Printex™ 30 commercially available from Orion Carbons. In case of A-II fillers, the adhesive composition typically will comprise 2 to 23 wt. %, preferably 5 to 18 wt. %, and more preferably 13 to 15 wt. % of a calcinated kaolin such as PoleStar™ 200R commercially available from Imerys; and 13 to 17 wt. %, preferably 2 to 23 wt. % and more preferably 5 to 13 wt. % of a uncoated kaoline such as Carbital™ 120 commercially available from Imerys.

For glass adhesion promotor ("Component B") such as Silquest™ A187, A189, and A1170, commercially available from Momentive, should be used at less than 2.5 wt. %, preferably less than 1.6 wt. % and more preferably less than 1.4 wt. %, all based on the total weight of the adhesive composition.

For Component C, the adhesive composition of the present invention preferably comprises 0.1 to 1.6 wt. %, preferably 0.4-1.2 wt. % and more preferably 0.6 to 1.1 wt % of dimethyl-tin-dilaurate, such as Formrez UL28 (as 2.4% solution in plasticizer DINP) commercially available from The Dow Chemical Company and 0.2 to 0.6 wt. %, preferably 0.3 to 0.4 wt. %, and more preferably 0.35 to 0.45 wt % to of DMDEE, all based on the total weight of the adhesive composition. Optionally, amine catalyst may also be additionally used to control skinning time.

For Component D, the adhesive composition of the present invention preferably comprises 0.1 to 50 wt. %, preferably 10 to 40 wt. % and more preferably 15 to 35 wt. % of diisononylphthalate such as Vestinol™ commercially available from Evonik.

For Component E-I, it is important to keep the amount of prepolymers low in the adhesive composition in order to maintain the flowability of the adhesive composition at cold or room temperatures. Therefore, the adhesive composition of the present invention preferably comprises 0.5 to 2.5 wt. %, preferably 0.8 to 1.8 wt. % and more preferably 1.0 to 1.5 wt % of a reaction product of polyesterpolyol and diphenylmethan-4,4'-diisocyanate ("MDI"), such as Prepolymer B.

Prepolymer B is prepared with this method: a polyether polyurethane prepolymer was prepared by mixing 46.7 g of plasticizer agent (branched plasticizer), 30.15 g of a iscocyanate (diphenylmethane 4,4'-diisocyanate) commercially available under the trade name Isonate™ M125U from The Dow Chemical Company with 190.0 g of a polyester polyol commercially available under the trade name DYNACOL™ 7381 from Evonik. Then, the entire mixture was stirred for 8 hours.

In addition to E-I prepolymer mentioned above, another MDI/PPO (diphenylmethane-4,4'-diisocyanat/polypropylenoxide polyol) based prepolymer such as Prepolymer A (Component E-II) may also be comprised in the adhesive composition. The composition preferably comprises 55-60 wt. %, preferably 55.2 to 57 wt. % and more preferably 55.5 to 56 wt. % of such MDI/PPO based prepolymer. All weight percentages are based on the total weight of the adhesive composition.

Preploymer A is prepared with this method: a polyether polyurethane prepolymer was prepared by mixing 22.3150 g of a polyoxypropylene diol having an average molecular weight of 2000 g/mol commercially available under the trade name Voranol™ 2000 L with 33.9350 g of a polyoxypropylene triol having an average molecular weight of 4650 g/mol and commercially available under the trade name Arcol™ CP 4655. 34.1430 g of plasticizer agent (linear plasticizer) were added. In addition, 9.5900 g diphenylmethane 4,4'-diisocyanate were added. Afterwards, 0.001 g of orthophosphoric acid in 0.009 g MEK was added. Then, the entire mixture was heated to 50° C. in a reactor and 0.007 g of stannous octoate and were added.

For Component F, the adhesive composition of the present invention comprises 0.1 to 3 wt. %, preferably 0.3 to 1.5 wt.

% and more preferably 0.5 to 0.8 wt. % of, hexamethylene diisocyanate trimers with a NCO content of about 21.8%, commercially available from Covestro as Desmodur® N3300; or polymeric MDL commercially available from the Dow Chemical Company as VORANATE™ M600. All weight percentages are based on the total weight of the adhesive composition.

For Component G, different solvents or heat stabilizers may be used at different amounts. In a typical embodiment, the adhesive composition may comprise, based on the total weight of the adhesive composition, 0.05 to 5 wt. %, preferably 0.05 to 3 wt. % and more preferably 0.05 to 1 wt. % of a Diethylmalonate (DEM) commercially available from BASF.

In one preferred embodiment, the ratio between Component E-II over Component A-II is between 1 to 3.55%, preferably between 2.5 to 3.55%, and more preferably between 3 to 3.55%.

The present invention can be further demonstrated with the following non-limiting examples.

To demonstrate the effectiveness of the present invention, a total of five examples were prepared in accordance to Table 1. Two of them are inventive examples and three of them are comparative examples.

TABLE 1

Examples and the comparison with comparative examples

| Component | Trade name | Inv Ex 1 | Comp Ex 3 | Comp Ex 4 | Comp Ex 5 | Inv Ex 2 |
|---|---|---|---|---|---|---|
| Component EII + 32% Component D | Prepoolymer A NCO1.41% | 56 | 56.2 | 56.4 | 56.55 | 56.75 |
| Component EI | Prepolymer B | 1.2 | 1.2 | 1.2 | 1.2 | 1.2 |
| Component F | VORANATE ™ M600 | 0.8 | | | | 0.8 |
| Component F | DESMODUR ® N3300 | 0.5 | 1.3 | 1.3 | 1.3 | 0.5 |
| Component AI | Printex ® 30 | 21.5 | 21.5 | 21.5 | 21.5 | 21.5 |
| Component AII | PoleStar ™ 200 R | 16 | 16 | 16 | 16 | 16 |
| Component G | DEM | 0.4 | 0.4 | 0.2 | 0.05 | 0.05 |
| Component D | Vestinol ® 9 (DINP) | 0.6 | 0.6 | 0.6 | 0.5 | 0.5 |
| Component B | Silquest ™ 189 | 0.8 | 0.8 | 0.8 | 0.8 | 0.6 |
| Component B | Dynasilan ® 1170 | 0.8 | 0.8 | 0.8 | 0.8 | 0.8 |
| Component C | DMDEE | 0.4 | 0.2 | 0.2 | 0.3 | 0.3 |
| Component C | UL 28 (2.4%) + Vestinol ® | 1.0 | 1.0 | 1.0 | 1.0 | 1.0 |
| | Total | 100 | 100 | 100 | 100 | 100 |

Above samples were prepared by mixing Components E-II (the PPO based prepolymer A) with Components B, C, D, F, G. Component A fillers such as carbon black, calcinated kaolin and fumed silica were added. The mixture was stirred for another five minutes under an atmosphere of nitrogen. The mixture was heated to 60° C. Component E-I was added at 60° C. and subsequently mixed for 35 minutes under vacuum. Then Components B, C, small portion D such as diisononylphtalate, the tin catalyst and the amine catalyst were added and the mixture was stirred for 15 minutes under vacuum or until a homogeneous pasteous black mixture (the adhesive composition) was obtained.

The adhesives were tested for its slippage resistance after 24 hours. It is expected that a slippage of 10 mm is the acceptable limit and 5 mm is considered a good slippage resistance.

The slippage test is designed based on lab test to assure slippage resistance of windscreens installed perpendicular and included the following steps:

Apply 2 parallel beads (approx. 12 g in total; triangle form, 8 mm base and 14 mm (standard size) height of material under test to a 190×90 mm (standard size) unprimed e-coat specimen and check for correct weight of applied bead of adhesive Maintain the material application temperature of 23° C.

3 min after application assemble with a 125×75 mm (standard size) unprimed glass plate to a bead thickness of 4 mm and fix in that position for 30 s Remove distance spacers and turn assembly to vertical position and fix one glass plate, add a weight to lower glass specimen to a total weight force of 8 N and measure the slippage after 1½ h Record all details of measurements and material under test As shown in Table 2, Inventive Example 1 demonstrates very good slippage resistance due to the very high amine catalyst amount in DMDEE. Also, Inventive Example 2 provides good, but higher slippage below the threshold (10 MM) as the amine catalyst content is slightly lower. Comparative Examples 3 and 4 showed high slippage due to low amounts of amine catalyst that correlates with skin formation. Comparative Example 5 shows slightly above threshold in slippage due to higher amounts of NCO-content (Isonate M600+Desmodur® N3300). The higher amount of NCO-content reduces the amine-catalyst/NCO ratio that correlates with curing speed/skinning time. That was suspected to be the reason for less slippage reduction.

TABLE 2

Slippage test results

| | Inv Ex 1 | Comp Ex 3 | Comp Ex 4 | Comp Ex 5 | Inv Ex 2 |
|---|---|---|---|---|---|
| Slippage in MM | 5 | 16 | 16 | 11 | 9 |

Amine-catalyst content, prepolymer to white pigment ratio were specifically varied in order to provide best possible surface tack and best slippage reduction. Particularly, the amine-catalyst that is needed for fast skin-over time is required in combination with higher white pigment usage to result in low slippage/high slippage resistance on glass surfaces.

Comparative Examples 3 to 5 reflect the current state of art. None of them has very low viscosity, very high G', i.e. 1×10(6) Pa*s, or very high amount of surface adhesion promotors and the combination of these factors resulted in an adhesive that slid off the very smooth glass surface. This slippage reduction performance is particularly important for primerless adhesives to glass adhesion where the ceramic frit glass coating is in between two glass layers and the adhesive therefor has to be place directly on the glass surface.

What is claimed is:

1. An adhesive composition comprising A) at least one of white pigments, carbon black, calcinated kaolin, fumed silica, calcium carbonate, uncoated kaoline, or a mixture thereof; B) one or more glass adhesion promotors; C) one or more catalysts; D) a plasticizer; E) prepolymer; F) a mixture of 0.1-0.8 wt %, based on the total weight of the composition, of hexamethylene diisocyanate trimer, and an aromatic isocyanate; and G) a solvent or heat stabilizer, wherein if the adhesive composition comprises carbon black, then the adhesive composition comprises from 18 to 23 wt % of carbon black.

2. The adhesive composition of claim 1, wherein the prepolymer comprises a reaction product of polyesterpolyol and diphenylmethan-4,4'-diisocyanate.

3. The adhesive composition of claim 2, wherein the composition comprises 0.5 to 2.5 wt. %, based on the total weight of the composition, of the reaction product of polyesterpolyol and diphenylmethan-4,4'-diisocyanate.

4. The adhesive composition of claim 1, wherein the catalyst comprises 2,2'-dimorpholinodiethylether.

5. The adhesive composition of claim 4, wherein the composition comprises 0.2 to 0.6 wt. %, based on the total weight of the composition, of 2,2'-dimorpholinodiethylether.

6. The adhesive composition of claim 1, comprising 0.1 to 3 wt. %, based on the total weight of the composition, of the mixture of 0.1-0.8 wt %, based on the total weight of the composition, of hexamethylene diisocyanate trimer, and an aromatic isocyanate.

7. The adhesive composition of claim 1, wherein a ratio between the prepolymer and A) is between 1.2:1 and 3.55:1.

8. The adhesive composition of claim 6, wherein the aromatic isocyanate is polymeric MDI.

9. The adhesive composition of claim 1, wherein the adhesive composition comprises from 18 to 23 wt % of carbon black.

* * * * *